United States Patent
Jung et al.

(10) Patent No.: US 11,902,492 B2
(45) Date of Patent: Feb. 13, 2024

(54) IMAGE PROCESSING METHOD AND APPARATUS FOR STEREOSCOPIC IMAGES OF NEARBY OBJECT IN BINOCULAR CAMERA SYSTEM OF PARALLEL AXIS TYPE

(71) Applicant: Korea Atomic Energy Research Institute, Daejeon (KR)

(72) Inventors: Seung-Ho Jung, Daejeon (KR); Hocheol Shin, Daejeon (KR); Chang-Hoi Kim, Sejong-si (KR); You-Rak Choi, Daejeon (KR); Dongseok Ryu, Seoul (KR); Jonghui Han, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 472 days.

(21) Appl. No.: 17/265,119

(22) PCT Filed: Aug. 1, 2019

(86) PCT No.: PCT/KR2019/009623
§ 371 (c)(1),
(2) Date: Feb. 1, 2021

(87) PCT Pub. No.: WO2020/027605
PCT Pub. Date: Feb. 6, 2020

(65) Prior Publication Data
US 2021/0314542 A1 Oct. 7, 2021

(30) Foreign Application Priority Data

Aug. 1, 2018 (KR) .................. 10-2018-0090038

(51) Int. Cl.
*H04N 13/128* (2018.01)
*H04N 13/239* (2018.01)
(Continued)

(52) U.S. Cl.
CPC ......... *H04N 13/128* (2018.05); *G06T 3/0093* (2013.01); *G06T 3/60* (2013.01); *H04N 13/239* (2018.05)

(58) Field of Classification Search
CPC ....... G06T 3/0093; G06T 3/60; H04N 13/122; H04N 13/128; H04N 13/239; H04N 13/246; H04N 13/341
(Continued)

(56) References Cited

U.S. PATENT DOCUMENTS 9,204,128 B2 12/2015 Morioka et al.
2003/0156751 A1* 8/2003 Lee .................. H04N 13/122
348/E13.016

(Continued)

FOREIGN PATENT DOCUMENTS

CN 105812766 A * 7/2016
CN 106507084 A * 3/2017 ........... H04N 13/128
(Continued)

OTHER PUBLICATIONS

The extended European Search Report dated Apr. 4, 2022 for corresponding European Patent Application No. 19844330.1.
(Continued)

*Primary Examiner* — Kathleen M Walsh
(74) *Attorney, Agent, or Firm* — Hauptman Ham, LLP

(57) ABSTRACT

An image processing method includes: calculating a rotation matrix to eliminate vertical parallax by converting stereo image captured by stereo camera as if it is image captured by camera rotated about an origin of camera coordinate system, wherein the stereo image includes left image
(Continued)

obtained by left camera and right image obtained by right camera; calculating a rotation matrix to adjust the horizontal parallax of the left image and a rotation matrix to adjust the horizontal parallax of the right image; calculating a geometric transformation matrix for the stereo image based on each camera characteristic matrix representing lens characteristics, the rotation matrix for eliminating vertical parallax, and the rotation matrices for adjusting horizontal parallax; and generating new stereo image in which vertical parallax is eliminated and horizontal parallax is adjusted by performing image warping for the stereo image captured by the stereo camera based on the calculated geometric transformation matrix.

6 Claims, 5 Drawing Sheets

(51) Int. Cl.
*G06T 3/00* (2006.01)
*G06T 3/60* (2006.01)

(58) Field of Classification Search
USPC .......................................................... 348/46
See application file for complete search history.

(56) References Cited

U.S. PATENT DOCUMENTS

| | | | |
|---|---|---|---|
| 2011/0150101 A1* | 6/2011 | Liu ...................... | H04N 13/161 |
| | | | 348/E13.001 |
| 2013/0170737 A1* | 7/2013 | Arita .................... | H04N 13/239 |
| | | | 382/154 |
| 2018/0184077 A1* | 6/2018 | Kato .................... | H04N 13/344 |
| 2019/0347822 A1* | 11/2019 | Nash ........................ | G06T 7/73 |
| 2020/0027243 A1* | 1/2020 | Ziegler ................ | H04N 13/246 |

FOREIGN PATENT DOCUMENTS

| | | | | |
|---|---|---|---|---|
| EP | 1 235 439 A2 | | 8/2002 | |
| EP | 1235439 A2 | * | 8/2002 | ............... G06K 9/03 |
| KR | 10-0597587 B1 | | 7/2006 | |
| KR | 10-2009-0013925 A | | 2/2009 | |
| KR | 10-2014-0028994 A | | 3/2014 | |
| KR | 10-2014-0118370 A | | 10/2014 | |
| KR | 10-1634225 B1 | | 6/2016 | |

OTHER PUBLICATIONS

International Search Report dated Nov. 19, 2019, corresponding to International Application No. PCT/KR2019/009623.

* cited by examiner

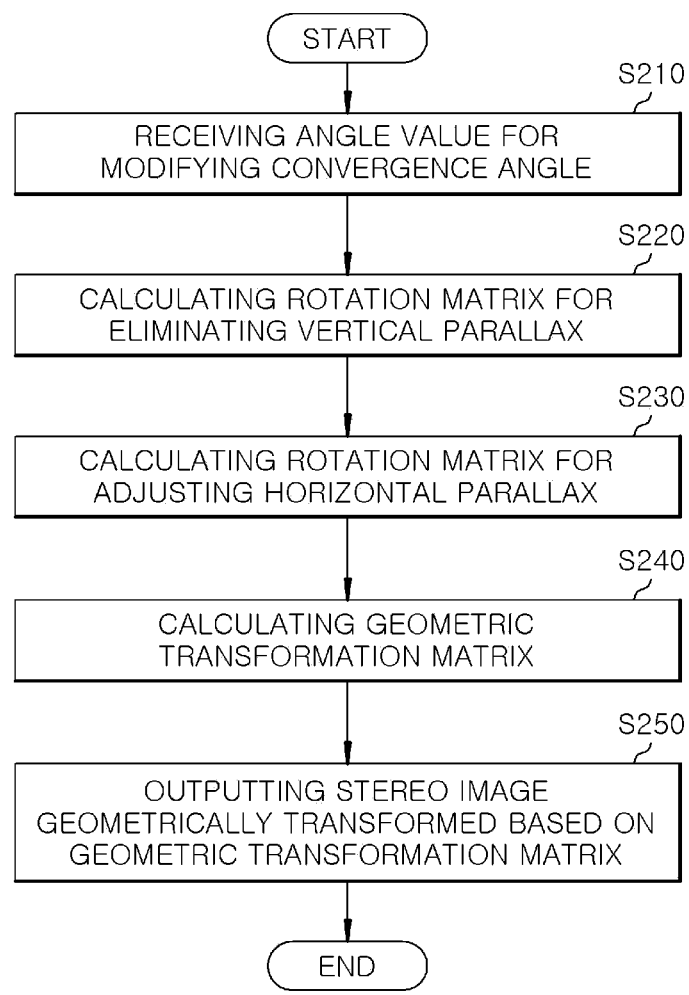

IMAGE PROCESSING METHOD AND APPARATUS FOR STEREOSCOPIC IMAGES OF NEARBY OBJECT IN BINOCULAR CAMERA SYSTEM OF PARALLEL AXIS TYPE

CROSS-REFERENCE TO RELATED APPLICATION

The present application is a national stage filing under 35 U.S.C § 371 of PCT application number PCT/KR2019/009623 filed on Aug. 1, 2019, which is based upon and claims the benefit of priorities to Korean Patent Application No. 10-2018-0090038, filed on Aug. 1, 2018, in the Korean Intellectual Property Office. The disclosures of the above-listed applications are hereby incorporated by reference herein in their entireties.

TECHNICAL FIELD

The present disclosure relates to a stereo image processing method and apparatus for a stereoscopic image, and more particularly, the image processing method and apparatus for photographing, by using a stereo camera, an object located at a relatively short distance, e.g., 15 to cm from the parallel axis type stereo camera and for displaying the photographed object on a 3D-display device such as a tabletop stereoscopic monitor or a head mount display, etc., so that a person who looks at the photographed stereo image comfortably experiences a three-dimensional effect.

BACKGROUND

As is generally known, a stereo camera that captures a source image for a three-dimensional image includes a parallel axis type, a toed-in type, and a horizontal moving axis type according to a camera arrangement and a camera structure.

The parallel axis type is a type in which two cameras thereof are fixedly arranged with a predetermined distance so that optical axis directions (which is a direction in which each camera is facing) are parallel to each other, and the structure of the parallel axis type is simple because there is no need for an additional device to move or rotate the camera. In the parallel axis type, the distance between the two cameras is usually 6.5 cm apart, which is an average distance between two eyes of a human. The parallel axis type stereo camera is suitable for a medium or long distance, and horizontal binocular parallax tends to be large for objects at a short distance. Herein, the binocular parallax refers to a difference between a position of an image point in a left image and a position of an image point in a right image with respect to a point in a space on the stereo image captured by the stereo camera. The binocular parallax includes vertical parallax regarding a vertical component of the image and horizontal parallax regarding a horizontal component of the image.

The toed-in type is a structure capable of rotating the optical axis direction of a camera, and is a type that rotates the optical axis of the camera according to a change in a distance of an object to be photographed so that an image of the object is photographed at the center of a left image and a right image. This type has an advantage of having a rich three-dimensional effect, but there is a high possibility that a keystone distortion (which is a phenomenon in which an image is distorted in a trapezoidal shape) occurs on the photographed image when an intersection angle between the two cameras thereof is relatively large. Herein, the rich three-dimensional effect means that when the photographed stereo image is watched through a 3D-display device, the three-dimensional effect is clearly felt even for objects that are relatively very close.

The horizontal moving axis type is a type in which two cameras thereof are arranged like a parallel axis type and a horizontal distance of the cameras can be adjusted, or in which a camera is fixed and an image sensor inside the camera can be moved horizontally. This type does not cause the keystone distortion on the image, but the three-dimensional effect is somewhat inferior to the toed-in type.

The toed-in type and the horizontal moving axis type can rotate or move the two cameras when necessary, however, it requires an additional device to do so, and thus, the size thereof is increased. Accordingly, manufacturing cost is increased and miniaturization is difficult.

Therefore, in general, the parallel axis type stereo camera is widely used.

In principle, in a parallel axis type stereo camera system, two cameras therein should be arranged so that they are in a relationship of parallel movement in the horizontal direction of the image without rotation, and by arranging the cameras in this way, an epipolar line on a left image and a right image becomes a horizontal line, the vertical parallax thereby does not occur in both eyes. However, in reality, it is difficult to perfectly arrange the two cameras so that they move in the horizontal direction of the image without rotation, and there is inevitably a certain degree of an error in camera arrangement.

When displaying the left image and the right image captured by the stereo camera on the 3D-display device, if the vertical parallax occurs between the left image and the right image because the epipolar line of the two images does not become the horizontal line, the three-dimensional effect that a person feels is lowered, and furthermore, the person can experience fatigue.

Since the error in camera arrangement can occur not only in the parallel axis type, but also in the toed-in type and the horizontal moving axis type, in the stereo camera system, a method to eliminate the vertical parallax caused by the error in camera arrangement must be devised.

According to a prior art, the error in the camera arrangement is removed through a stereo image rectification algorithm for stereo images photographed by the parallel axis type stereo camera system, thereby making a perfect parallel axis type stereo camera so that the vertical parallax between the left image and the right image is eliminated.

However, the stereo image rectification algorithm can eliminate vertical parallax, but cannot adjust or eliminate the horizontal parallax.

As a method for adjusting the horizontal parallax, there is a method suggested in Korean Patent Publication No. 10-0597587. Korean Patent Publication No. 10-0597587 proposed an image processing method of calculating the number of pixels to be moved in a vertical direction and a horizontal direction through an image processing algorithm for control over a convergence angle of an image captured by a parallel axis type stereo camera, of moving the image vertically and horizontally by the calculated number of pixels, and then of enlarging the image to its original size. In other words, the vertical parallax is eliminated through the image movement in the vertical direction, and the horizontal parallax is reduced through the image movement in the horizontal direction, that is, the convergence angle is reduced.

However, the image processing method proposed in Korean Patent Application Publication No. 10-0597587 cannot eliminate the vertical parallax from the stereo image when there is a rotation error occurring when two cameras are arranged in the parallel axis type stereo camera system. The proposed image processing method can eliminate the vertical parallax only if there is a position error rather than the rotation error.

In addition, even though a near point (also referred to as a visual range), which is the shortest distance at which a person can see an object without eye fatigue, was different from person to person, there was no consideration for this, so there is a problem of not being able to see objects clearly or experiencing fatigue according to the difference in the near points of the persons who see the three-dimensional image through the 3D-display device.

SUMMARY

According to the embodiment, an image processing method and an image processing apparatus for inputting a stereo image captured by a stereo camera and for adjusting and outputting vertical parallax and horizontal parallax are provided.

In accordance with a first aspect of the present disclosure, there is provided an image processing method of processing a stereo image to impart a three-dimensional effect on a nearby object in a stereoscopic image system using a stereo camera of a parallel axis type including a left camera and a right camera, the method including: calculating a rotation matrix for eliminating vertical parallax to eliminate the vertical parallax by converting the stereo image captured by the stereo camera as if it is an image captured by a camera rotated about an origin of a camera coordinate system, wherein the stereo image includes a left image obtained by the left camera and a right image obtained by the right camera; calculating a rotation matrix for adjusting horizontal parallax to adjust the horizontal parallax of the left image and a rotation matrix for adjusting horizontal parallax to adjust the horizontal parallax of the right image; calculating a geometric transformation matrix for the stereo image based on each camera characteristic matrix representing lens characteristics of the stereo camera, the rotation matrix for eliminating the vertical parallax, and the rotation matrices for adjusting the horizontal parallax; and generating a new stereo image in which the vertical parallax is eliminated and the horizontal parallax is adjusted by performing image warping for the stereo image captured by the stereo camera based on the calculated geometric transformation matrix.

In accordance with a second aspect of the present disclosure, there is provided An image processing method of processing a stereo image to impart a three-dimensional effect on a nearby object in a stereoscopic image system using a stereo camera of a parallel axis type including a left camera and a right camera, the stereo image including a left image obtained by the left camera and a right image obtained by the right camera, the method including: calculating a rotation matrix for adjusting horizontal parallax to adjust the horizontal parallax of the left image and a rotation matrix for adjusting horizontal parallax to adjust the horizontal parallax of the right image; calculating a geometric transformation matrix for the stereo image based on each camera characteristic matrix representing lens characteristics of the stereo camera and the rotation matrices for adjusting the horizontal parallax; and generating a new stereo image in which the horizontal parallax is adjusted by performing image warping for the stereo image captured by the stereo camera based on the calculated geometric transformation matrix.

In accordance with a third aspect of the present disclosure, there is provided An image processing apparatus for processing a stereo image to impart a three-dimensional effect on a nearby object in a stereoscopic image system using a stereo camera of a parallel axis type including a left camera and a right camera, the method including: an input unit configured to input the stereo image captured by the stereo camera; an image processing unit configured to adjust vertical parallax and horizontal parallax of the stereo image; and an output unit configured to output the stereo image in which the vertical parallax and the horizontal parallax are adjusted by the image processing unit, wherein the image processing unit is configured to: calculate a rotation matrix for eliminating vertical parallax to eliminate the vertical parallax by converting the stereo image captured by the stereo camera as if it is an image captured by a camera rotated about an origin of a camera coordinate system, wherein the stereo image includes a left image obtained by the left camera and a right image obtained by the right camera; calculate a rotation matrix for adjusting horizontal parallax to adjust the horizontal parallax of the left image and a rotation matrix for adjusting horizontal parallax to adjust the horizontal parallax of the right image; calculate a geometric transformation matrix for the stereo image based on each camera characteristic matrix representing lens characteristics of the stereo camera, the rotation matrix for eliminating the vertical parallax, and the rotation matrices for adjusting the horizontal parallax; and generate a new stereo image in which the vertical parallax is eliminated and the horizontal parallax is adjusted by performing image warping for the stereo image captured by the stereo camera based on the calculated geometric transformation matrix to provide to the output unit.

According to the embodiment, the horizontal parallax may be adjusted while eliminating the vertical parallax existing in the stereo image.

In a case of remote operation, such as working with a remotely controlled robot, the stereo image captured by a parallel axis type stereo camera may be shown through a 3D-display device such as a tabletop stereoscopic monitor or a head mounted display. At this time, for elaborate operation, the stereo camera may be arranged relatively close to target objects.

According to the embodiment of the present disclosure, since an operator may adjust in real time the 3D-display device while using the 3D-display device, the operator may remotely operate the 3D-display display device with a comfortable three-dimensional effect for nearby objects regardless of a near point (or a visual range) of the eye which is different from person to person, a size of a monitor, or a distance from the monitor, etc.

In addition, according to the embodiment, an algorithm for adjusting the horizontal parallax is included in an image rectification algorithm for eliminating the vertical parallax, so that separate time for image processing is not needed to adjust the horizontal parallax, thereby maintaining the number of frames per second of the camera.

In addition, according to the embodiment, the image processing method of rotating the stereo image at a given angle to adjust the horizontal parallax has an effect similar to that of mechanically rotating the camera in a toed-in type, and thus, the operator experiences a rich three-dimensional effect as in the toed-in type.

BRIEF DESCRIPTION OF THE DRAWINGS

FIG. 2 shows a flow chart illustrating an image processing method performed by an image processing apparatus according to the embodiment of the present disclosure.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Hereinafter, an image processing apparatus 100 and an image processing method performed by the image processing apparatus 100 according to the embodiment of the present disclosure will be described in detail with reference to FIGS. 1 to 5.

Figure 1:
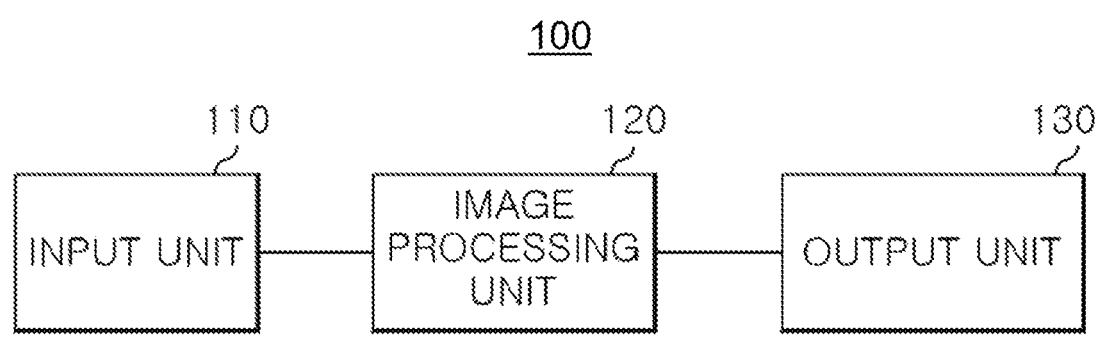
FIG. 1 shows a functional block diagram of an image processing apparatus according to the embodiment of the present disclosure.

FIG. 1 shows a functional block diagram of the image processing apparatus 100 according to the embodiment of the present disclosure.

As shown in FIG. 1, the image processing apparatus 100 according to the embodiment may include an input unit 110, an image processing unit 120, and an output unit 130.

The input unit 110 may receive a stereo image captured by a stereo camera and may provide it to the image processing unit 120. In addition, the input unit 110 may receive an angle value for modifying a convergence angle of an operator for a stereoscopic image, that may be displayed by using the stereo image, to correspond to a position of a near point of the operator, and may transmit the received angle value to the image processing unit 120. For example, the image processing apparatus 100 according to the embodiment may preset an angle value that allows the convergence angle to be modified to correspond to the position of the near point of the operator.

The image processing unit 120 may adjust vertical parallax and horizontal parallax through image processing for the stereo image. The image processing unit 120 may use an algorithm that converts the stereo image captured by any one camera as if it is an image captured by a camera rotated about an origin of a camera coordinate system, and calculate a rotation matrix for eliminating the vertical parallax to adjust the vertical parallax. In addition, in order for the convergence angle for stereoscopic image that may be displayed by using the stereo image to be modified to correspond to the position of the near point according to the angle value provided by the input unit 110, the image processing unit 120 may calculate a rotation matrix for adjusting the horizontal parallax to adjust the horizontal parallax by converting the stereo image as if it is an image captured by the stereo camera rotated by the angle value provided by the input unit 110 about a y-axis of a virtual camera coordinate system after eliminating the vertical parallax. Further, the image processing unit 120 may calculate a geometric transformation matrix by reflecting a camera characteristic matrix representing lens characteristics of the stereo camera, the rotation matrix for eliminating the vertical parallax, and the rotation matrix for adjusting the horizontal parallax. Herein, the camera characteristic matrix may be a matrix including distortion coefficients for a camera-lens combination obtained through a camera calibration process. Furthermore, the image processing unit 120 may provide the stereo image in which the vertical parallax and the horizontal parallax are adjusted to the output unit 130 through image warping using the geometric transformation matrix for the stereo image.

The output unit 130 may output the stereo image in which the vertical parallax and the horizontal parallax are adjusted by the image processing unit 120.

FIG. 2 shows a flow chart illustrating an image processing method performed by the image processing apparatus 100 according to the embodiment of the present disclosure.

Referring to FIG. 2, in a step S210, the image processing method according to the embodiment may receive an angle value for modifying a convergence angle of an operator for a stereoscopic image that may be displayed by using a stereo image to correspond to a position of a near point of the operator.

In addition, in a step S220, the image processing method according to the embodiment may calculate a rotation matrix for eliminating the vertical parallax to eliminate the vertical parallax by using an algorithm that converts the stereo image captured by a single camera as if it is an image captured by a camera rotated about an origin of a camera coordinate system.

Further, in a step S230, the image processing method according to the embodiment may calculate a rotation matrix for adjusting the horizontal parallax to adjust the horizontal parallax by converting the stereo image as if it is an image captured by a stereo camera rotated by the received angle value about a y-axis of a virtual coordinate system after eliminating the vertical parallax in order for the convergence angle for the stereoscopic image that may be displayed by using the stereo image to be modified to correspond to the position of the near point according to the received angle value.

Furthermore, in a step S240, the image processing method according to the embodiment may calculate a geometric transformation matrix by reflecting a camera characteristic matrix representing lens characteristics of the stereo camera, the rotation matrix for eliminating the vertical parallax, and the rotation matrix for adjusting the horizontal parallax.

In addition, in a step S250, the image processing method according to the embodiment may output the stereo image in which the vertical parallax and the horizontal parallax are adjusted through image warping using the geometric transformation matrix.

In the image processing method according to the embodiment illustrated in FIG. 2, it is described that the step S210 of receiving the angle value for modifying the convergence angle of the operator to correspond to the position of the near point of the operator is performed before the step S220 of calculating the rotation matrix for eliminating the vertical parallax, but the step S210 of receiving the angle value for modifying the convergence angle may be performed after the step S220 of calculating the rotation matrix for eliminating the vertical parallax. In other words, the step S210 of receiving the angle value for modifying the convergence angle may be performed at any time if the step S210 is performed before the step S230 of calculating the rotation matrix for adjusting the horizontal parallax. Hereinafter, for convenience, the embodiment in which the step S210 of receiving the angle value for modifying the convergence angle of the operator to correspond to the position of the near point of the operator is performed before the step S220 of calculating the rotation matrix for eliminating the vertical parallax will be described.

Figure 3A:
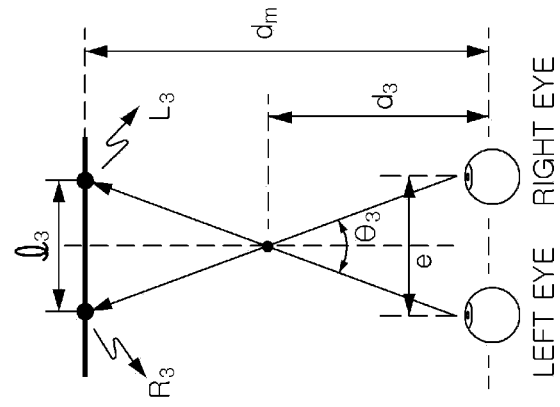
FIGS. 3A to 3C show a diagram illustrating a difference in a sense of distance that an operator feels according to positions of a left image point and a right image point on a stereoscopic monitor according to the embodiment of the present disclosure.
Figure 3B:
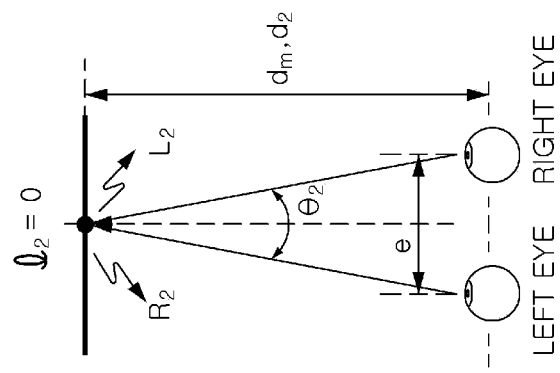
Figure 3C:
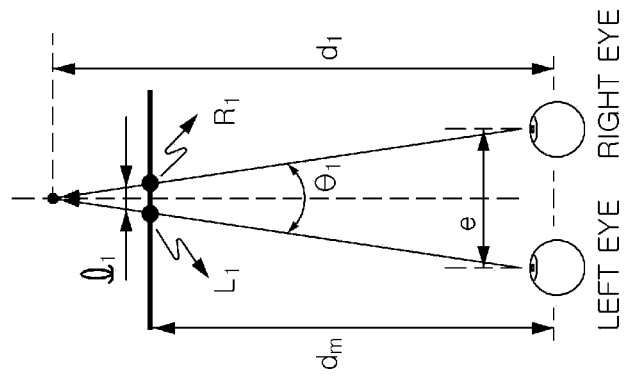

FIGS. 3A to 3C assume that a 3D-display device is a tablet stereoscopic monitor without vertical parallax in order to schematically illustrate a distance of an object felt by an operator through the 3D-display device when the operator looks at a stereo image captured by a stereo camera through the 3D-display device.

FIG. 3A shows a positive parallax in a case of $R_1 > L_1$ FIG. 3B shows a zero parallax in a case of $L_2 = R_2$, and FIG. 3C shows a negative parallax in a case of $L_3 > R_3$. Herein, is a distance between two eyes, $d_m$ is a distance between the eyes and the 3D-display device, $R_1$, $R_2$, $R_3$ are positions of an image point by a right camera on the stereoscopic monitor, $L_1$, $L_2$, $L_3$ are positions of an image point by a left camera on the stereoscopic monitor, $l_1$, $l_2$, $l_3$ are horizontal binocular parallax, $\theta_1$, $\theta_2$, $\theta_3$ are the convergence angle, and $d_1$, $d_2$, $d_3$ are focal distances or distances to a point felt by the operator.

For the distance felt by the operator through the 3D-display device, the smaller the convergence angle between a left image point and a right image point on the 3D-display device, the farther the point is, and the larger the convergence angle, the closer the point is. Herein, the convergence angle refers to a relationship between the stereo image displayed on the 3D-display device and a human eye seeing the 3D-display device, and an angle between a straight line connecting the left image point of the object on the 3D-display device and a left eye of a person and a straight line connecting the right image point of the object on the 3D-display device and the right eye of the person. In FIGS. 3A to 3C, if the straight line connecting the left eye and the left image point of the object is referred to a first straight line, and the straight line connecting the right eye and the right image point of the object is referred to a second straight line, the convergence angle indicates an angle between the first straight line and the second straight line.

It may be seen from FIGS. 3A to 3C that the convergence angle is different based on the horizontal binocular parallax $l_1$, $l_2$, $l_3$ of the left image point and the right image point on the 3D-display device, the distance $d_m$ between the eyes of the operator and the 3D-display device, and the distance e between the two eyes of the operator.

In a case of normal eyes of a person, the near point which is the shortest distance to look at an object without fatigue is about 25 cm. However, in a case of presbyopia due to aging, the near point may increase to 50 cm or more due to poor adaptability. When a person looks at an object, if the object is closer than the near point, he or she cannot look at the object clearly and may experience fatigue.

When the operator looks at the stereo image through the 3D-display device, if the distance to the object felt by a person is closer than the near point of the operator looking at it, a three-dimensional effect will be reduced and the operator will experience fatigue. Therefore, in this case, the convergence angle for the object may be lowered for the operator to feel that the object is farther than the near point. In order to lower the convergence angle, the distance between the eyes of a person and the 3D-display device may be increased, but this is a very passive and impractical solution.

In a step S210, the image processing apparatus 100 according to the embodiment of the present disclosure may receive, through the input unit 110, an angle value for modifying the convergence angle of the operator for a stereoscopic image that may be displayed by using the stereo image to correspond to the near point of the operator.

In addition, the image processing unit 120 may, through image processing for the stereo image provided from the input unit 110, eliminate vertical parallax and adjust horizontal parallax. The image processing process performed by the image processing unit 120 will be described in detail.

First, an algorithm for converting an image captured by a single camera like an image captured by a camera rotated about an origin of a camera coordinate system will be described.

Figure 4:
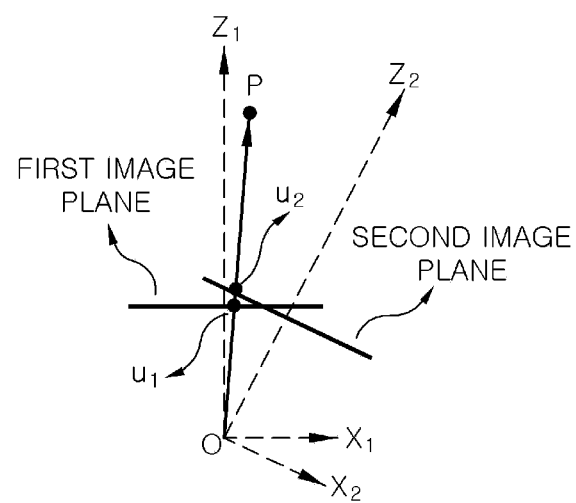
FIG. 4 shows a diagram illustrating a camera coordinate system and an image plane in a camera coordinate system which is rotated about an origin of the camera coordinate system according to the embodiment of the present disclosure.

FIG. 4 shows a schematic diagram briefly illustrating a single camera coordinate system and an image plane in a camera coordinate system which is rotated about an origin of the camera coordinate system according to the embodiment of the present disclosure.

Assuming that two camera coordinate systems are a first camera coordinate system and a second camera coordinate system, an image point $u_1$ by a first camera and an image point $u_2$ by a second camera for a point p are described as following Equation 1 and Equation 2 according to a projection theory.

$$\hat{u}_1 \propto K_1 x_1 \qquad \text{(Equation 1)}$$

$$\hat{u}_2 \propto K_2 x_2 \qquad \text{(Equation 2)}$$

In Equation 1 and Equation 2, $x_1$ and $x_2$ are position vectors of the point p in a space described in the first camera coordinate system and the second camera coordinate system respectively, and $\hat{u}_1 = [u_1^T 1]^1$ and $\hat{u}_2 = [u_2^T 1]^1$ are homogeneous coordinates vectors of the image points $u_1$ and $u_2$ respectively. Further, a superscript T indicates transpose of matrix, and $\propto$ indicates a proportional relationship.

In addition, in Equation 1 and Equation 2, $K_1$, $K_2$ are camera characteristic matrices having a size of 3×3 representing lens characteristics of a camera, and are obtained through a camera calibration process. Through the camera calibration process, distortion coefficients that describe image distortion due to incompleteness of camera lens may be obtained, and since various methods of calibrating the image distortion by using the distortion coefficients are proposed in a field of a Vision theory, detailed explanation thereof is omitted herein. The stereo image captured by the camera referred to in the present disclosure may be considered as an image where the image distortion is calibrated or as an image without the image distortion.

If the first camera coordinate system and the second camera coordinate system are in a rotational relationship, a coordinate transformation equation such as Equation 3 below is established between the two coordinate systems.

$$x_1 = R_{12} x_2 \quad \text{(Equation 3)}$$

Herein, $R_{12}$ indicates a rotation matrix from the first camera coordinate system to the second camera coordinate system.

Equation 4 and Equation 5 below are derived from Equations 1 to 3.

$$\hat{u}_2 \partial K_2 R_{12}{}^T K_1{}^{-1} \hat{u}_1 \quad \text{(Equation 4)}$$

$$\lambda \hat{u}_2 = K_2 R_{12}{}^T K_1{}^{-1} \hat{u}_1 \quad \text{(Equation 5)}$$

Equation 5 shows a relationship between the image points $u_1$ and $u_2$ by the two cameras in a rotational relationship, and $\lambda$ means a constant according to a projection.

If the first camera and the second camera are the same camera, $u_1$ is an image point taken before the camera rotates, $u_2$ is an image point taken after the camera rotates, and if the camera characteristic matrix K and the rotation matrix $R_{12}$ are obtained, then Equation 6 below is used to generate an image after the rotation from an image before the rotation.

$$\lambda u_2 = K R_{12}{}^T K^{-1} u_1 \quad \text{(Equation 6)}$$

If the characteristic matrix of each camera and a coordinate transformation between the two cameras are obtained through the stereo camera calibration, a stereo image rectification to eliminate the vertical parallax may be performed by using Equation 6.

Hereinafter, a stereo image rectification algorithm for eliminating the vertical parallax of the stereo image will be described.

It is assumed that the coordinate transformation equation between the left camera coordinate system and the right camera coordinate system is the same as in Equation 7 below.

$$x_L = R_{LR} x_R + t_{LR} \quad \text{(Equation 7)}$$

Herein, $x_L$ is a position of a point p in the three-dimensional space described in the left camera coordinate system, $x_R$ is a position of the point p described in the right camera coordinate system, and $R_{LR}$ is the rotation matrix from the left camera coordinate system to the right camera coordinate system (described in the left camera coordinate system) and $t_{LR}$ is a translation vector from the left camera coordinate system to the right camera coordinate system (described in the left camera coordinate system).

In order that the stereo image captured by the two cameras becomes a stereo image of a perfect parallel axis type stereo camera, first, a coordinate transformation equation is derived for the left camera. The process of deriving the coordinate transformation equation for the left camera is as follows.

First, since the translation vector $t_{LR}$ from the left camera coordinate system to the right camera coordinate system is a horizontal axis (or x-axis) of the left camera, and a direction vector of the x-axis of a new left camera coordinate system is a direction of the translation vector $t_{LR}$, so a unit vector $e_x$ in the x-axis direction of the new left camera coordinate system described in an old left camera coordinate system is shown in Equation 8 below.

$$e_x = \frac{t_{LR}}{|t_{LR}|} \quad \text{(Equation 8)}$$

In addition, a unit direction vector of a y-axis of the new left camera coordinate system is set to be perpendicular to a plane defined by a z-axis of the old left camera coordinate system and $t_{LR}$. In other words, a unit vector $e_y$ in the y-axis direction of the new left camera coordinate system described in the old left camera coordinate system is shown in Equation 9 below.

$$e_y = \frac{t}{|t|} = \frac{1}{\sqrt{t_x^2 + t_y^2}}[-t_y \ t_x \ 0]^T \quad \text{(Equation 9)}$$

Herein, $t_{LR} = [t_x \ t_y \ t_z]^1$ and $t = e_{2\text{-}old} \times t_{LR} = [0\ 0\ 1] \times t_{LR} = [-t_y \ t_x \ 0]^1$. In this case, $e_{2\text{-}old}$ is a unit vector in the z-axis direction of the old left camera coordinate system, x is a cross product, and the superscript 1 indicates the transpose of the matrix.

Thereafter, since the unit vector in the z-axis direction of the new left camera coordinate system is perpendicular to a plane defined by the x-axis and the y-axis of the new left camera coordinate system as shown in Equation 10 below, a rotation matrix $R_{L\text{-}NL}$ from the old left camera coordinate system to the new left camera coordinate system is shown in Equation 11 below.

$$e_z = e_x \times e_y \quad \text{(Equation 10)}$$

$$R_{L\text{-}NL} = [e_x e_y e_z] \quad \text{(Equation 11)}$$

In addition, a coordinate transformation equation from the old left camera coordinate system to the new left camera coordinate system is shown in Equation 12 below.

$$x_L = R_{L\text{-}NL} x_{NL} \quad \text{(Equation 12)}$$

Herein, $x_{NL}$ is a position vector described in the left camera coordinate system after the stereo image is rectified.

Therefore, following Equation 13 is established from Equation 7, which is the coordinate transformation equation between the old left camera coordinate system and an old right camera coordinate system, and Equation 12, which is the coordinate transformation equation from the old left camera coordinate system to the new left camera coordinate system, and thus Equation 14 is derived.

$$R_{L\text{-}NL} x_{NL} = R_{LR} x_R + t_{LR} \quad \text{(Equation 13)}$$

$$x_{NL} = R_{L\text{-}NL}{}^T R_{LR} x_R + R_{L\text{-}NL}{}^T t_{LR} \quad \text{(Equation 14)}$$

Herein, if a coordinate transformation equation from the old right camera coordinate system to the new right camera coordinate system is Equation 15 below, Equation 16 below is derived from Equation 14.

$$x_{NR} = R_{L\text{-}NL}{}^T R_{LR} x_R \quad \text{(Equation 15)}$$

$$x_{NL} = x_{NR} + R_{NL\text{-}L} t_{LR} \quad \text{(Equation 16)}$$

Herein, $R_{NL\text{-}L}$ is equal to Equation 17 below.

$$R_{NL-L} = R_{L-NL}^T = \begin{bmatrix} e_x^T \\ e_y^T \\ e_z^T \end{bmatrix} \quad \text{(Equation 17)}$$

Herein, $$e_x = \frac{t_{LR}}{|t_{LR}|}, e_y = \frac{1}{\sqrt{t_x^2 + t_y^2}}[-t_y \ t_x \ 0]^T, e_z = e_x \times e_y,$$

and $t_{LR} = [t_x \ t_y \ t_z]^T$ indicates the translation vector from the left camera coordinate system to the right camera coordinate system.

In Equation 16, the last term $R_{L-NL}{}^T t_{LR}$ on a right-hand side describes, in the new left camera coordinate system, $t_{LR}$ described in the old left camera coordinate system, and Equation 18 below is calculated by using Equation 17.

$$R_{NL-L}t_{LR} = \begin{bmatrix} e_x^T \\ e_y^T \\ e_z^T \end{bmatrix} t_{LR} = \begin{bmatrix} e_x^T t_{LR} \\ e_y^T t_{LR} \\ e_z^T t_{LR} \end{bmatrix} \quad \text{(Equation 18)}$$

However, since $e_z$ is the unit vector of $t_{LR}$ and defined as $$e_x = \frac{t_{LR}}{|t_{LR}|}$$

in Equation 8, Equation 19 below is derived, and since $e_y$ and $e_x$ are $e_z$, that is, the vertical direction of $t_{LR}$, $e_y{}^T t_{LR}$ and $e_z{}^T t_{LR}$ are both zero.

$$e_x^T t_{LR} = \frac{t_{LR}^T t_{LR}}{|t_{LR}|} = |t_{LR}| \quad \text{(Equation 19)}$$

Therefore, following Equation 20 is derived, and if Equation 16 is described again by using Equation 20, Equation 21 below is derived.

$$R_{NL-L}t_{lR} = \begin{bmatrix} |t_{LR}| \\ 0 \\ 0 \end{bmatrix} \quad \text{(Equation 20)}$$

$$x_{NL} = x_{NR} + \begin{bmatrix} |t_{LR}| \\ 0 \\ 0 \end{bmatrix} \quad \text{(Equation 21)}$$

Equation 21 shows that a relationship of parallel translation in the direction of the x-axis is established between $x_{NL}$ and $x_{NR}$.

In other words, if an old left camera is rotated by the rotation matrix $R_{L-NL}$ of Equation 11, and the right camera is rotated by $(R_{L-NL}{}^T R_{LR})^T$ as shown in Equation 15, the new left camera coordinate system and the new right camera coordinate system are not rotated but a parallel translation relationship in the x-axis (a horizontal direction of a camera image) is established, and the z-axis of the two coordinate systems become parallel, resulting in a perfect parallel axis type stereo camera system.

The stereo image rectification does not actually rotate the camera, but by mapping the images captured by the old camera by using Equation 6 as if they were captured by the rotated camera, makes the images captured by the perfect parallel axis type stereo camera.

By using Equation 6, Equation 12, and Equation 17, following Equations 22 and 23 are established between image points $\hat{u}_{NL}$, $\hat{u}_{NR}$ by the left camera and the right camera after the stereo image rectification and image points $\hat{u}_L$, $\hat{u}_R$ by the left camera and the right camera before the stereo image rectification.

$$\lambda_{NL}\hat{u}_{NL} = K_L R_{rect} K_L^{-1} \hat{u}_L \quad \text{(Equation 22)}$$

$$\lambda_{NR}\hat{u}_{NR} = K_R R_{LR} K_R^{-1} \hat{u}_R \quad \text{(Equation 23)}$$

Herein, $R_{rect}$ is a rotation matrix capable of eliminating the vertical parallax of the stereo image, and is defined as Equation 24 and Equation 25 below.

$$R_{rect} = R_{NL-L} = R_{L-NL}^T = \begin{bmatrix} e_x^T \\ e_y^T \\ e_z^T \end{bmatrix} \quad \text{(Equation 24)}$$

$$R_{rect} R_{LR} = R_{L-NL}{}^T R_{LR} = R_{NL-L} R_{LR} \quad \text{(Equation 25)}$$

In Equations 22 to 25, $K_L$, $K_R$ are the camera characteristic matrices representing the lens characteristics of the left camera and the right camera respectively, and $\hat{u}_L$ and $\hat{u}_R$ are homogeneous coordinate vectors of image points by the left camera and the right camera before the stereo image rectification respectively, and $\hat{u}N_L$ and $\hat{u}_{NR}$ are the homogeneous coordinate vector of image points by the left camera and the right camera after the stereo image rectification respectively. Further, a superscript −1 means an inverse matrix.

Accordingly, in the step S220, a rotation matrix $R_{rect}$ for eliminating the vertical parallax to adjust the vertical parallax of the stereo image may be calculated by the image processing unit 120 of the image processing apparatus 100.

On the other hand, the image processing unit 120 of the image processing apparatus 100 according to the embodiment may make the stereo image as if an image captured by a toed-in type stereo camera by adjusting a cross angle through an effect that rotates the left camera by an angle and the right camera rotates by an angle −θ respectively about the y-axis which is the vertical direction of the stereo image.

Figure 5:
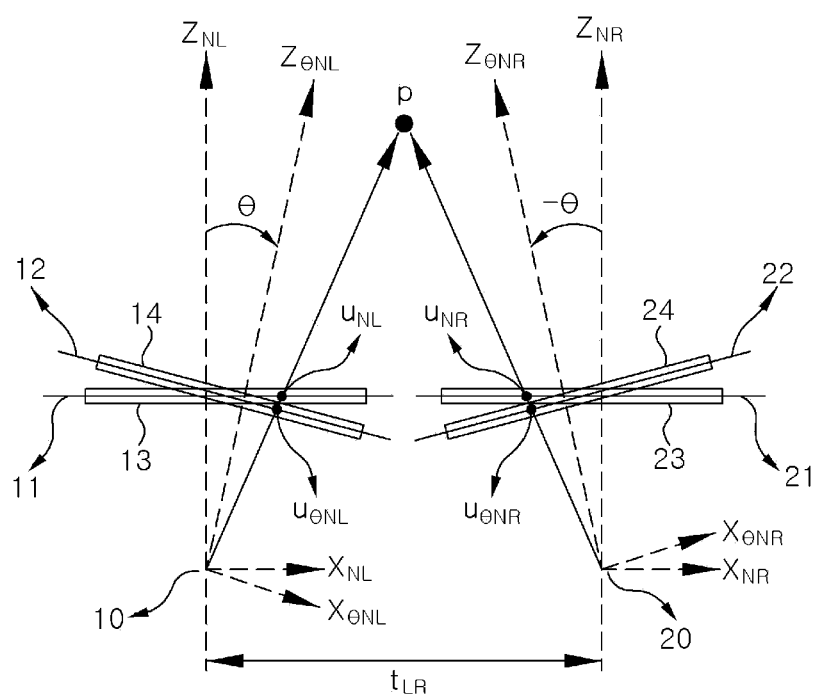
FIG. 5 shows a diagram illustrating a relationship between a stereo image rotated for adjusting horizontal parallax and a stereo image before the rotation according to the embodiment of the present disclosure.

FIG. 5 shows a diagram illustrating a relationship between a stereo image rotated for adjusting horizontal parallax and a stereo image before the rotation according to the embodiment of the present disclosure.

In FIG. 5, $x_{NL}$-$y_{NL}$-$z_{NL}$ is a coordinate system of a virtual left camera 10, $x_{NR}$-$y_{NR}$-$z_{NR}$ is a coordinate system of a virtual right camera 20, $x_{\theta NL}$-$y_{\theta NL}$-$z_{\theta NL}$ is a coordinate system of the virtual left camera 10 after rotation by an angle θ about a $y_{NL}$-axis, and $x_{\theta NR}$-$y_{\theta NR}$-$z_{\theta NR}$ is a coordinate system of the virtual right camera 20 after rotation by an angle −θ about a $y_{NR}$-axis. $t_{NR}$ is a translation vector between origins of a left camera coordinate system and a right camera coordinate system, a point p is a point in a space, $u_{NL}$, $u_{NR}$ are image points of the point p on an image before rotation, and $u_{\theta NL}$, $u_{\theta NR}$ are image points of the point p on the image after rotation.

On the other hand, the image point may be a point constituting the image, and these image points (for example, $u_{NL}$, $u_{NR}$ and $u_{\theta NL}$, $u_{\theta NR}$) may be included in image planes 11, 21, 12, and 22, which are planes including the image. For example, the image point $u_{NL}$ by the left camera 10 may be one point constituting a left image 13 and may be included in the image plane 11 of the left camera 10. The image point $u_{NR}$ by the right camera 20 may be one point constituting the right image 23 and may be included in the image plane 21 of the right camera 20.

If the image is rotated to adjust parallax, the image planes including the images may also be rotated. For example, when the left image 13 is rotated, the image plane 11 of the left camera 10 is rotated, so that a rotated image plane 12 including a rotated left image 14 may be formed. Likewise, when the right image 23 is rotated, the image plane 21 of the right camera 20 is rotated, thereby forming a rotated image plane 22 including a rotated right image 24. Although described later, the parallax of the image of a stereo camera may be adjusted through this process.

A coordinate transformation equation such as following Equation 26 is established for the coordinate system generated by rotating the left camera coordinate system about the y-axis by the angle θ, and a coordinate transformation equation such as following Equation 27 is established for the coordinate system generated by rotating the right camera coordinate system about the y-axis by the angle −θ.

$$x_{NL} = R_y(\theta) x_{\theta NL} \quad \text{(Equation 26)}$$

$$x_{NR} = R_y(-\theta) x_{\theta NR} \quad \text{(Equation 27)}$$

Herein, $R_y^{(\theta)}$ is a rotation matrix to adjust horizontal parallax for the left image and $R_y^{(-\theta)}$ is a rotation matrix to adjust horizontal parallax for the right image, and $R_y^{(\theta)}$ and $R_y^{(-\theta)}$ may be calculated by using Equation 28 and Equation 29 below.

$$R_y(\theta) = \begin{bmatrix} \cos\theta & 0 & \sin\theta \\ 0 & 1 & 0 \\ -\sin\theta & 0 & \cos\theta \end{bmatrix} \quad \text{(Equation 28)}$$

$$R_y(-\theta) = \begin{bmatrix} \cos\theta & 0 & -\sin\theta \\ 0 & 1 & 0 \\ \sin\theta & 0 & \cos\theta \end{bmatrix} \quad \text{(Equation 29)}$$

In the step S230, the rotation matrix $R_y^{(\theta)}$ to adjust the horizontal parallax for the left image and the rotation matrix $R_y^{(-\theta)}$ to adjust the horizontal parallax for the right image are calculated by the image processing unit 120 according to angle values (θ, −θ) for modifying the convergence angle input in the step S210.

In addition, Equation 26 and Equation 27 may be described as Equation 30 and Equation 31 below by using Equation 12, Equation 15, Equation 24, and Equation 25.

$$x_{\theta NL} = R_y^T(\theta) x_{NL} = R_y^T(\theta) R_{Rect} x_L \quad \text{(Equation 30)}$$

$$x_{\theta NR} = R_y^T(-\theta) x_{NR} = R_y^T(-\theta) R_{Rect} R_{LR} x_{NR} \quad \text{(Equation 31)}$$

In addition, a relationship equation between the image point $u_{NL}$ by the left camera whose vertical parallax is adjusted and the image point $u_{\theta NL}$ by the rotated left camera is shown in Equation 32 below, and a relationship equation between the image point $u_{NR}$ by the right camera whose vertical parallax is adjusted and the image point $u_{\theta NR}$ by the rotated right camera is shown in Equation 33 below.

$$\lambda_{\theta NL} u_{\theta NL} = M_L u_L \quad \text{(Equation 32)}$$

$$\lambda_{\theta NR} u_{\theta NR} = M_R u_R \quad \text{(Equation 33)}$$

Herein, $M_L M_R$ are defined by Equation 34 and Equation 35.

$$M_L = K_L R_y^T(\theta) R_{Rect} K_L^{-1} \quad \text{(Equation 34)}$$

$$M_R = K_R R_y^T(-\theta) R_{Rect} R_{LR} K_R^{-1} \quad \text{(Equation 35)}$$

In Equation 34 and Equation 35, $M_L$, $M_R$ are geometric transformation matrices for transforming an original image captured by the camera into a new image, and $\lambda_{\theta NL}$ and $\lambda_{\theta NR}$ in Equation 32 and Equation 33 are constants according to projection. Further, the angle θ is the angle rotated about the y-axis of the left camera coordinate system, and if the angle θ increases with respect to an object located in front of the stereo camera, the horizontal parallax decreases and an operator feels that the object is located farther away.

Accordingly, in the step S240, the geometric transformation matrices $M_L$, $M_R$ are calculated by the image processing unit 120 of the image processing apparatus 100.

Thereafter, in the step S250, the image processing unit 120 of the image processing apparatus 100 may apply Equation 32 and Equation 33 to all image points of an image captured by the left camera and all image points of an image captured by the right camera, respectively, to geometrically transform the original image, the output unit 120 of the image processing apparatus 100 may output a new image transformed by the image processing unit 120. This transformation of the original image into the new image through the geometric transformation is called image warping. At this time, since the image warping algorithm is an algorithm well known in a field of a projection theory and vision technology, detailed explanation thereof is omitted herein.

If a stereo image from which the vertical parallax and the horizontal parallax are eliminated by the image processing apparatus 100 according to the embodiment is displayed through a 3D-display device, the operator viewing the 3D-display device may comfortably immerse themself in a three-dimensional effect. An appropriate angle θ for the comfortable three-dimensional effect may vary depending on a near point (visual range) of an eye which differs for each operator, a size of a monitor or a distance from the monitor, and a distance between the camera and the object when photographing the object, etc. However, in a case in which the operator looks at the stereo image through a tablet stereoscopic monitor at a distance of about 40 cm from the operator, the angle θ may range from about 1 to 5 degrees and the angle −θ may range from about −1 to −5 degrees for objects located at a relatively short distance (15 to 50 cm).

When comparing a result of the image processing of the present disclosure with that of a prior art for the image captured by the parallel axis type stereo camera, the result in a case of adjusting only the vertical parallax has high horizontal parallax, thereby the operator experiences fatigue. On the other hand, in the result of the present disclosure in a case of adjusting both the vertical parallax and the horizontal parallax, the distances of the objects are felt farther than the near point of the eye because the horizontal parallax is reduced, so that the operator may comfortably experience the three-dimensional effect.

In addition, according to the embodiment of the present disclosure, the vertical parallax and the horizontal parallax existing in the stereo image may be eliminated irrespective of errors in a camera arrangement.

Further, since each person may adjust the convergence angle to suit his or her near point while viewing a stereoscopic image, the each person may not only look at the object clearly, but also do not experience fatigue due to the horizontal parallax.

On the other hand, in the above-described embodiment, the case in which the vertical parallax is simultaneously eliminated when adjusting the horizontal parallax has been described, but in a case in which it is not necessary to eliminate the vertical parallax from the stereo image captured by the stereo camera (that is, the vertical parallax is eliminated in advance in the stereo camera, or the vertical parallax is very small because of the well-arranged stereo camera, etc.), only the horizontal parallax may be adjusted.

In this way, in the case in which only the horizontal parallax of the stereo image is adjusted, a rotation matrix for adjusting the horizontal parallax to adjust the horizontal parallax of a left image among the stereo image captured by the stereo camera and a rotation matrix for adjusting the horizontal parallax to adjust the horizontal parallax of a right image among the stereo image may be calculated, and a geometric transformation matrix for the stereo image may be calculated based on each camera characteristic matrix representing lens characteristics of the stereo camera and the rotation matrices for adjusting the horizontal parallax. Based on the calculated geometric transformation matrix, the image warping may be performed for the stereo image captured by the stereo camera, thereby generating a new stereo image with adjusted horizontal parallax. In this case, the geometric transformation matrix may be calculated by using Equation 36 and Equation 37 below.

$$M_L = K_L R_y^T(\theta) K_L^{-1} \qquad \text{(Equation 36)}$$

$$M_R = K_R R_y^T(-\theta) K_{LR} K_R^{-1} \qquad \text{(Equation 37)}$$

In Equations 36 and 37, $M_L$ is a geometric transformation matrix for the left image among the stereo image captured by the stereo camera, $M_R$ is a geometric transformation matrix for the right image among the stereo image captured by the stereo camera, $K_L$ is a camera characteristic matrix representing lens characteristics of the left camera, $K_R$ is a camera characteristic matrix representing lens characteristics of the right camera, $R_y(\theta)$ is a rotation matrix for adjusting the horizontal parallax for the left image, $R_y(-\theta)$ is a rotation matrix for adjusting the horizontal parallax for the right image, $R_{LR}$ is a rotation matrix from a left camera coordinate system to a right camera coordinate system, a superscript −1 means an inverse matrix, and a superscript T means transpose of a matrix.

Combinations of blocks in each block diagram and steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each block of the block diagram or each step of the flowchart. The computer program instructions can also be stored on a computer-usable or computer-readable recording medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each block of the block diagram or each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each block of the block diagram and each step of the flowchart.

In addition, each block or each step may represent a module, a segment, or a portion of codes which contains one or more executable instructions for executing the specified logical function(s). It should also be noted that in some alternative embodiments, the functions mentioned in the steps may occur out of order. For example, two blocks or two steps illustrated in succession may in fact be performed substantially simultaneously, or the blocks or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An image processing method of processing a stereo image to impart a three-dimensional effect on a nearby object in a stereoscopic image system using a stereo camera of a parallel axis type including a left camera, a right camera, and an image processing unit, the method comprising:

calculating a vertical rotation matrix ($R_{rect}$) for eliminating vertical parallax of the stereo image by using the following equation, $$R_{rect} = \begin{bmatrix} e_x^T \\ e_y^T \\ e_z^T \end{bmatrix},$$

wherein $$e_x = \frac{t_{LR}}{|t_{LR}|},$$

wherein $$e_y = \frac{1}{\sqrt{t_x^2 + t_y^2}} [-t_y \ t_x \ 0]^T,$$

wherein $e_z = e_x \times e_y$, and
wherein
$t_{LR} = [t_x, t_y, t_z]^T$ indicates a translation vector from a left camera coordinate system to a right camera coordinate system,
$e_x$ indicates a unit vector in the x-axis direction of a new left camera coordinate system,
$e_y$ indicates a unit vector in the y-axis direction of the new left camera coordinate system, and
$e_z$ indicates a unit vector in the z-axis direction of the new left camera coordinate system, and wherein the stereo image includes a left image obtained by the left camera and a right image obtained by the right camera;

calculating a first horizontal rotation matrix for adjusting a first horizontal parallax of the left image and a second horizontal rotation matrix for adjusting a second horizontal parallax of the right image;

calculating a geometric transformation matrix for the stereo image based on each camera characteristic matrix representing lens characteristics of the stereo camera, the vertical rotation matrix, the first horizontal rotation matrix, and the second horizontal rotation matrix; and generating a new stereo image in which the vertical parallax is eliminated and the first horizontal parallax and the second horizontal parallax are adjusted by performing image warping for the stereo image captured by the stereo camera based on the calculated geometric transformation matrix.

2. The image processing method of claim 1, wherein the first horizontal rotation matrix ($R_L$) for adjusting the horizontal parallax for the left image of the stereo image and the second horizontal rotation matrix ($R_R$) for adjusting the horizontal parallax for the right image are calculated by using the following equations, $$R_L = R_y(\theta) = \begin{bmatrix} \cos\theta & 0 & \sin\theta \\ 0 & 1 & 0 \\ -\sin\theta & 0 & \cos\theta \end{bmatrix}, \text{ and}$$

$$R_R = R_y(-\theta) = \begin{bmatrix} \cos\theta & 0 & -\sin\theta \\ 0 & 1 & 0 \\ \sin\theta & 0 & \cos\theta \end{bmatrix},$$

wherein the angle values ($\theta, -\theta$) are predetermined angle values.

3. The image processing method of claim 1, wherein the geometric transformation matrix is calculated by using the following equations, $M_L = K_L R_y^T(\theta) R_{rect} K_L^{-1}$ and $M_R = K_R R_y^T(-\theta) R_{rect} R_{LR} K_R^{-1}$, wherein $M_L$ is a geometric transformation matrix for the left image among the stereo image captured by the stereo camera, $M_R$ is a geometric transformation matrix for the right image among the stereo image captured by the stereo camera, $K_L$ is a camera characteristic matrix representing lens characteristics of the left camera, $K_R$ is a camera characteristic matrix representing lens characteristics of the right camera, $R_y(\theta)$ is a first horizontal rotation matrix for adjusting the first horizontal parallax for the left image, $R_y(-\theta)$ is a second horizontal rotation matrix for adjusting the second horizontal parallax for the right image, $R_{rect}$ is a vertical rotation matrix for adjusting the vertical parallax, $R_{LR}$ is a rotation matrix from a left camera coordinate system to a right camera coordinate system, a superscript −1 means an inverse matrix, and a superscript T means transpose of a matrix.

4. The image processing method of claim 3, wherein the image warping derives an image point $u_{\theta NL}$ by a new left camera and an image point $u_{\theta NR}$ by a new right camera, which have relationship equations with an image point $u_L$ by the left camera and an image point $u_R$ by the right camera on the stereo image captured by the stereo camera, wherein the relationship equations include $\lambda_{\theta NL} u_{\theta NL} = M_L u_L$ and $\lambda_{\theta NR} u_{\theta NR} = M_R u_R$, and wherein $\lambda_{\theta NL}$ and $\lambda_{\theta NR}$ are projection constants.

5. An image processing method of processing a stereo image to impart a three-dimensional effect on a nearby object in a stereoscopic image system using a stereo camera of a parallel axis type including a left camera and a right camera, the stereo image including a left image obtained by the left camera and a right image obtained by the right camera, the method comprising:

calculating a first horizontal rotation matrix for adjusting a first horizontal parallax of the left image and a second horizontal rotation matrix for adjusting a second horizontal parallax of the right image;

calculating a geometric transformation matrix for the stereo image based on each camera characteristic matrix representing lens characteristics of the stereo camera, the first horizontal rotation matrix, and the second horizontal rotation matrix; and generating a new stereo image in which the first horizontal parallax and the second horizontal parallax are adjusted by performing image warping for the stereo image captured by the stereo camera based on the calculated geometric transformation matrix, wherein the geometric transformation matrix is calculated by using the following equations, $M_L = K_L R_y^T(\theta) K_L^{-1}$ and $M_R = K_R R_y^T(-\theta) R_{LR} K_R^{-1}$, and wherein $M_L$ is a geometric transformation matrix for the left image among the stereo image captured by the stereo camera, $M_R$ is a geometric transformation matrix for the right image among the stereo image captured by the stereo camera, $K_L$ is a camera characteristic matrix representing lens characteristics of the left camera, $K_R$ is a camera characteristic matrix representing lens characteristics of the right camera, $R_y(\theta)$ is the first horizontal rotation matrix for adjusting the first horizontal parallax for the left image, $R_y(-\theta)$ is the second horizontal rotation matrix for adjusting the second horizontal parallax for the right image, $R_{LR}$ is a rotation matrix from a left camera coordinate system to a right camera coordinate system, a superscript −1 means an inverse matrix, and a superscript T means transpose of a matrix.

6. An image processing apparatus for processing a stereo image to impart a three-dimensional effect on a nearby object in a stereoscopic image system using a stereo camera of a parallel axis type including a left camera and a right camera, the method comprising:

an input unit configured to input the stereo image captured by the stereo camera;

an image processing unit configured to adjust vertical parallax and horizontal parallax of the stereo image, the horizontal parallax including a first horizontal parallax of a left image obtained by the left camera and a second horizontal parallax of a right image obtained by the right camera; and an output unit configured to output the stereo image in which the vertical parallax and the horizontal parallax are adjusted by the image processing unit, wherein the image processing unit is configured to:

calculate a vertical rotation matrix for eliminating vertical parallax of the stereo image by using the following equation, $$R_{rect} = \begin{bmatrix} e_x^T \\ e_y^T \\ e_z^T \end{bmatrix},$$

wherein $$e_x = \frac{t_{LR}}{|t_{LR}|},$$

wherein $$e_y = \frac{1}{\sqrt{t_x^2+t_y^2}}[-t_y \quad t_x \quad 0]^T,$$

wherein $e_z = e_x \times e_y$, and wherein $t_{LR} = [t_x, t_y, t_z]^T$ indicates a translation vector from a left camera coordinate system to a right camera coordinate system, $e_x$ indicates a unit vector in the x-axis direction of a new left camera coordinate system, $e_y$ indicates a unit vector in the y-axis direction of the new left camera coordinate system, and $e_z$ indicates a unit vector in the z-axis direction of the new left camera coordinate system, and wherein the stereo image includes a left image obtained by the left camera and a right image obtained by the right camera;

calculate a first horizontal rotation matrix for adjusting the first horizontal parallax of the left image and a second horizontal rotation matrix for adjusting the second horizontal parallax of the right image;

calculate a geometric transformation matrix for the stereo image based on each camera characteristic matrix representing lens characteristics of the stereo camera, the vertical rotation matrix, the first horizontal rotation matrix, and the second horizontal rotation matrix; and generate a new stereo image in which the vertical parallax is eliminated and the first horizontal parallax and the second horizontal parallax are is adjusted by performing image warping for the stereo image captured by the stereo camera based on the calculated geometric transformation matrix to provide to the output unit.

\* \* \* \* \*